(12) United States Patent
Okada

(10) Patent No.: US 7,736,107 B2
(45) Date of Patent: Jun. 15, 2010

(54) CLIPPING DEVICE

(75) Inventor: Shigeo Okada, Kanagawa (JP)

(73) Assignee: Piolax, Inc., Yokohama-shi (JP)

( * ) Notice: Subject to any disclaimer, the term of this patent is extended or adjusted under 35 U.S.C. 154(b) by 125 days.

(21) Appl. No.: 11/088,921

(22) Filed: Mar. 25, 2005

(65) Prior Publication Data

US 2005/0220561 A1 Oct. 6, 2005

(30) Foreign Application Priority Data

Mar. 30, 2004 (JP) .............................. 2004-099021
Jul. 15, 2004 (JP) .............................. 2004-208236

(51) Int. Cl.
*F16B 13/04* (2006.01)
*F16B 19/00* (2006.01)

(52) U.S. Cl. ........................... 411/41; 411/45; 411/508; 411/913

(58) Field of Classification Search ................ 411/41, 411/45–48, 508, 913
See application file for complete search history.

(56) References Cited

U.S. PATENT DOCUMENTS

| | | | | |
|---|---|---|---|---|
| 2,956,468 A | * | 10/1960 | Macy ........................... | 411/41 |
| 3,383,976 A | * | 5/1968 | Schenkel ..................... | 411/62 |
| 3,756,116 A | * | 9/1973 | Schuplin ..................... | 411/15 |
| 4,077,300 A | * | 3/1978 | Yoda ........................... | 411/15 |
| 4,085,651 A | * | 4/1978 | Koscik ........................ | 411/43 |
| 4,122,583 A | * | 10/1978 | Grittner et al. ............. | 24/703.1 |
| 4,674,930 A | * | 6/1987 | Poe et al. .................... | 411/40 |
| 4,702,447 A | * | 10/1987 | Westwood, III ........ | 248/231.51 |
| 4,716,633 A | * | 1/1988 | Rizo ............................ | 24/453 |
| 4,743,152 A | * | 5/1988 | Nakayama et al. ......... | 411/182 |
| 4,762,437 A | * | 8/1988 | Mitomi ....................... | 403/11 |
| 4,856,950 A | * | 8/1989 | Bushnell ..................... | 411/41 |
| 4,952,106 A | * | 8/1990 | Kubogochi et al. ......... | 411/48 |
| 4,987,639 A | * | 1/1991 | Baiuley et al. .............. | 16/445 |

(Continued)

FOREIGN PATENT DOCUMENTS

EP         1375931 A1 *  1/2004

(Continued)

OTHER PUBLICATIONS

Japanese Office Action dated Aug. 26, 2008 with English translation.

*Primary Examiner*—Victor Batson
*Assistant Examiner*—David Reese
(74) *Attorney, Agent, or Firm*—McGinn Intellectual Property Law, PLLC

(57) ABSTRACT

A clipping device including a pin and a grommet, the pin including an engaging groove, an enlarging groove, the grommet including a flange part and a body part, the body part being divided into a plurality of divisional leg portions interposing slits, inwardly directed projections being formed on respective inner faces of the divisional leg portions, wherein the pin is provided with a stepped part on its upper end edge, and a swinging piece which is connected to a side face of the divisional leg portion so as to swing in a horizontal direction is provided in the slit of the grommet, the swinging piece being projected outwardly from the body part of the grommet while it is in a free state, and adapted to be pressed by inner peripheral faces of panel holes when inserted into the panel holes.

23 Claims, 9 Drawing Sheets

U.S. PATENT DOCUMENTS

| | | | |
|---|---|---|---|
| 5,028,187 A * | 7/1991 | Sato | 411/48 |
| 5,085,545 A * | 2/1992 | Takahashi | 411/45 |
| 5,201,623 A * | 4/1993 | Benedetti et al. | 411/48 |
| 5,211,519 A * | 5/1993 | Saito | 411/45 |
| 5,222,852 A * | 6/1993 | Snyder | 411/553 |
| 5,322,402 A * | 6/1994 | Inoue | 411/510 |
| 5,689,863 A * | 11/1997 | Sinozaki | 24/297 |
| 5,695,296 A * | 12/1997 | Miura | 403/2 |
| 5,704,746 A * | 1/1998 | Leib et al. | 411/24 |
| 5,718,549 A * | 2/1998 | Noda et al. | 411/553 |
| 5,846,040 A * | 12/1998 | Ueno | 411/45 |
| 5,907,653 A * | 5/1999 | Burek et al. | 385/135 |
| 6,039,523 A * | 3/2000 | Kraus | 411/48 |
| 6,364,586 B1 * | 4/2002 | Okada | 411/41 |
| 6,507,976 B2 * | 1/2003 | Ichimaru | 16/82 |
| 6,511,273 B2 * | 1/2003 | Arisaka | 411/48 |
| 6,726,417 B2 * | 4/2004 | Kanie | 411/48 |
| 6,769,849 B2 * | 8/2004 | Yoneoka | 411/45 |
| 6,955,514 B2 * | 10/2005 | Hoshi | 411/508 |
| 6,979,162 B2 * | 12/2005 | Kato | 411/371.1 |
| 7,105,119 B2 * | 9/2006 | Kanie et al. | 264/238 |
| 7,207,759 B2 * | 4/2007 | Kato | 411/45 |
| 2002/0003993 A1 * | 1/2002 | Ichimaru | 411/325 |
| 2003/0143053 A1 * | 7/2003 | Kanie | 411/45 |
| 2004/0020016 A1 * | 2/2004 | Yoneoka | 24/297 |
| 2004/0175250 A1 * | 9/2004 | Yoneoka | 411/45 |
| 2005/0019130 A1 * | 1/2005 | Kanie et al. | 411/45 |
| 2005/0220560 A1 * | 10/2005 | Shinozaki et al. | 411/37 |
| 2005/0220561 A1 * | 10/2005 | Okada | 411/41 |

FOREIGN PATENT DOCUMENTS

| | | | |
|---|---|---|---|
| JP | 44-7768 | 4/1969 | |
| JP | 61-42212 | 2/1986 | |
| JP | 2-8506 | 2/1990 | |
| JP | 5-10524 | 2/1993 | |
| JP | 2000283132 A * | 10/2000 | |
| JP | 2003-172327 | 6/2003 | |
| JP | 2003-247518 | 9/2003 | |
| WO | WO03072957 A2 * | 9/2003 | 411/41 |

* cited by examiner

CLIPPING DEVICE

BACKGROUND OF THE INVENTION

1. Field of the Invention

The present invention relates to a clipping device for fixing two sheet members, such as two panels or a panel and a decorative material, to each other in a superposed state, and more particularly, to the clipping device in which the superposed and fixed state of the sheet members can be easily released.

Further, the present invention relates to a clipping device for fixing two sheet members such as two panels or a panel and a decorative material to each other in a superposed state, and more particularly, to the clipping device including a pin and a grommet which have been integrally molded of synthetic resin.

2. Description of the Related Art

A conventional clipping device of one type includes two components, namely, a pin and a grommet which are separately formed of synthetic resin, though not shown in a drawing specifically. The pin, the former, is in a columnar shape and provided with an engaging groove, an enlarging groove and a releasing groove which are formed on its outer peripheral face, in this order from a lower position, and set in such a manner that the engaging groove at the lower position and the releasing groove at an upper position have smaller groove diameters than the enlarging groove at a middle position. The grommet, the latter, has a cylindrical shape including a flange part and a body part. This body part is divided into a plurality of divisional leg portions interposing slits, and each of the divisional leg portions which can be enlarged in an opposed manner is provided, on its inner face, with an inwardly directed projection which is adapted to be engaged with the respective grooves of the aforesaid pin (Reference should be made to JP-B-5-10524, for example).

In order to superpose and fix two panels employing these pin and grommet, the pin is inserted into the grommet, as a first step, and then, the pin and the grommet are provisionally retained, by engaging the inwardly directed projections of the opposed divisional leg portions in the body part of the grommet with the engaging groove of the pin. Thereafter, the body part of the grommet is inserted into respective mounting holes in the panels, and an upper part of the pin which is projected from the flange part of the grommet is further pushed into the mounting holes. As the results, the inwardly directed projections of the divisional leg portions will be disengaged from the engaging groove, and will be engaged, this time, with the enlarging groove at the middle position which has the larger diameter, thus enabling the opposed divisional leg portions to be enlarged outwardly. In this manner, the two panels are fixed to each other in the superposed state.

On the other hand, in order to release the panels from the superposed and fixed state, the pin is further pushed in the same direction as the superposing and fixing direction. Then, the inwardly directed projections of the opposed divisional leg portions will be disengaged from the enlarging groove, and will be engaged, this time, with the releasing groove at the upper position which has the smaller diameter. With this motion, the divisional leg portions will be automatically released from the enlarged state, and return to their original free state, thereby to release the clamping state with respect to the panels. Therefore, the superposed and fixed state of the panels can be easily released, by pulling out, thereafter, the grommet together with the pin from the mounting holes.

As described above, the conventional clipping device has had such an advantage that the superposed and fixed state between the panels can be easily released without damaging the pin and the grommet, because a so-called push-push system has been employed. However, in order to reliably engage the inwardly directed projections of the divisional leg portions with the releasing groove of the pin for this purpose, it is necessary to provide means for preventing the pin from being excessively pushed into an interior of the grommet. Although such means have been provided between the pin and the grommet also in the conventional clipping device, under the circumstances that the pin and the grommet have been separately molded of synthetic resin from the beginning, it has been necessary to pre-assemble them, by inserting the pin into the interior of the grommet in advance by hand or by an assembling machine, after molding. Accordingly, the clipping device has been unable to be manufactured at low cost. It has been also considered to integrally mold the pin and the grommet, and thereafter, to pre-assemble them by inserting the pin into the interior of the grommet. However, in case where the pin and the grommet have been integrally molded, even though it has been intended to provide means for preventing the pin from being excessively inserted into the grommet, for example, a convex part for receiving a stepped part of the pin, on the body part of the grommet, it has been technically difficult to provide the convex part, since the pin in which has been integrally molded so as to cover an upper part of an opening in the grommet may become an obstacle. Even though the convex part having a small protruding amount can be provided, it has been difficult for this convex part to reliably prevent an excessive insertion of the pin with a sufficient strength.

Further, as conventional clipping devices of one type, a number of the clipping devices having various structures have been heretofore proposed. Essentially, any of them is an integrally molded product of synthetic resin, and includes two components, namely, a pin in a columnar shape and a grommet in a cylindrical shape. The pin, the former has a head part, and a shaft part adapted to be inserted into a body part of the grommet which will be described below. The grommet, the latter, has a flange part, and a body part which can be enlarged. The pin and the grommet are integrally coupled by means of small bridge pieces which can be torn off (Reference should be made to JP-B-44-7768, JP-A-61-42212, JP-A-2003-172327 and JP-A-2003-247518, for example).

For this reason, it is needless to say that the pin and the grommet are easy to be handled in the conventional clipping device, because they have been integrally molded from the beginning of molding. Especially in case where they are assembled into a provisionally retained state, the aforesaid small bridge pieces will be torn off inside or outside a molding cavity, and in this state, the shaft part of the pin will be forcibly inserted into the body part of the grommet, whereby the pin and the grommet can be immediately assembled into the provisionally retained state. Therefore, the clipping device has such an advantage that an assembling work can be extremely simplified, and cost for a mold for molding work can be reduced.

As described above, the conventional clipping device which has been integrally molded has had a remarkable advantage that the assembling work can be simplified as compared with the clipping device which has been separately molded. On the contrary, in case of forcibly tearing the small bridge pieces in order to obtain the provisionally retained state between the pin and the grommet, there has been such anxiety that, in case where the tearing action is conducted on a side of the pin, the small bridge pieces remaining on a side of the grommet become serious obstacles, on occasion of inserting the shaft part of the pin completely into the body part of the grommet for enlarging the body part of the grommet outwardly, and the shaft part of the pin becomes difficult to be smoothly inserted into the body part of the grommet.

SUMMARY OF THE INVENTION

The invention has been made in view of the above described circumstances, and according to a first aspect of the invention, there is provided a clipping device including a pin and a grommet which have been integrally molded of synthetic resin, the pin including an engaging groove, an enlarging groove, and a releasing groove which are formed on its outer peripheral face, in this order from a lower position, and set in such a manner that the engaging groove at the lower position and the releasing groove at an upper position have smaller groove diameters than the enlarging groove at a middle position, the grommet including a flange part and a body part, the body part being divided into a plurality of divisional leg portions interposing slits, inwardly directed projections adapted to be engaged with the grooves of the aforesaid pin being formed on respective inner faces of the divisional leg portions, characterized in that the pin is provided with a stepped part on its upper end edge, and a swinging piece which is connected to a side face of one of the divisional leg portions so as to swing in a horizontal direction around a connecting part is provided in the slit which divides the body part of the grommet, the swinging piece being projected outwardly from the body part of the grommet while it is in a free state, and adapted to be pressed by inner peripheral faces of panel holes when inserted into the panel holes, thereby to be inwardly projected into the body part of the grommet.

According to a second aspect of the invention in the first aspect of the invention, the slit opens from a bottom to a top of the body part of the grommet, and the swinging piece is positioned in a depth of an upper part of this slit.

According to a third aspect of the invention in the second aspect of the invention, the slit is narrower in its lower area and broader in its upper area, and the swinging piece is positioned in the broader area of this slit.

According to a fourth aspect of the invention in the first aspect of the invention, the swinging piece has a large projecting amount at a position remote from the connecting part in the free state thereof, and the connecting part of the swinging piece has a smaller thickness than the swinging piece.

According to a fifth aspect of the invention in the first aspect of the invention, the pin is provided with a guide groove in an axial direction on its outer peripheral face corresponding to the swinging piece, and the stepped part is formed at an upper end of the guide groove.

According to a sixth aspect of the invention in the first aspect of the invention, the body part of the grommet has a narrow slit which opens halfway from the bottom to the top, a convex part being formed on an inner face of the body part at an upper end area of the narrow slit, and the pin is provided with a rib wall which is adapted to enter into the narrow slit, in a range from the engaging groove to the enlarging groove, whereby an upper end edge of the rib wall can be engaged with the aforesaid convex part.

According to a seventh aspect of the invention, there is provided a clipping device including a pin and a grommet which have been integrally molded of synthetic resin, the grommet including a flange part and a body part, the flange part being provided with an opening communicated with an inside of the body part, the body part being divided into a plurality of divisional leg portions interposing slits, characterized in that the pin and the grommet are coupled to each other by means of small bridge pieces which can be torn off, in a state where a tip end part of the pin is positioned inside an opening in the grommet, and respective outer end sides of the small bridge pieces to be connected to an edge of the opening in the grommet are made more fragile than inner end sides thereof to be connected to an edge of the tip end part of the pin.

According to a eighth aspect of the invention in the seventh aspect of the invention, the small bridge pieces are located at respective circumferential positions corresponding to the slits which divide the body part of the grommet.

According to a ninth aspect of the invention in the seventh or eighth aspect of the invention, the tip end part of the pin is in a tapered shape, and the inner end sides of the small bridge pieces are connected to a face of the pin having the tapered shape.

According to a tenth aspect of the invention in any one of the seventh to ninth aspect of the invention, four sheets of the small bridge pieces are located on radial lines intersecting at right angles.

According to the first aspect of the invention, in order to release the panels from the superposed and fixed state in which the inwardly directed projections respectively formed on the divisional leg portions of the grommet have been engaged with the enlarging groove of the pin, when the pin is further pushed-in in the same direction as the superposing and fixing direction, the stepped part which is formed at the upper end edge of the pin will be butted against the swinging piece which has been pressed by the inner peripheral faces of the mounting holes in the panels and inwardly projected into the body part of the grommet thereby to prevent the pin from being excessively pushed in. As the result, it can be assured that the inwardly directed projections of the divisional leg portions will be disengaged from the enlarging groove, and then, will be reliably engaged with the releasing groove. Therefore, it is possible, for the first time, with this structure to give a sufficient projecting height to the swinging piece in a used state, even though the pin and the grommet have been integrally molded of synthetic resin, and hence, the excessive insertion can be more reliably prevented in spite of a low cost, as compared with the prior art.

According to the second aspect of the invention, it can be assured that the divisional leg portions of the body part can be smoothly opened or closed by the presence of the slits which open from the below to the top. Moreover, because the swinging piece is positioned in the depth of the upper part of this slit, the divisional leg portions will not be easily enlarged even though the swinging piece is connected to one of the divisional leg portions, and the inwardly projecting amount of the swinging piece into the body part can be sufficiently secured.

According to the third aspect of the invention, because the swinging piece is positioned in the broader area of the slit, a circumferential length of the swinging piece itself and a length of the connecting portion can be sufficiently obtained, whereby the inwardly projecting amount of the swinging piece can be further secured.

According to the fourth aspect of the invention, the swinging piece has the larger projecting amount at the position remote from the connecting portion, and more over, the connecting part of the swinging piece has the smaller thickness than the swinging piece, whereby the inwardly projecting amount of the swinging piece can be further secured.

According to the fifth aspect of the invention, because the pin is provided with the guide groove in an axial direction on its outer peripheral face corresponding to the swinging piece, the swinging piece which is inwardly projected into the body part will not be an obstacle, when the pin is pushed into the body part of the grommet. At the same time, because the stepped part is formed at the upper end of the guide groove, the reliably butted state between the stepped part and the swinging piece can be obtained.

According to the sixth aspect of the invention, the rib wall of the pin enters into the narrow slit in the body part of the grommet, whereby the pin will be retained from rotating with respect to the body part. At the same time, the upper end edge of the rib wall is engaged with the convex part which is formed on the inner face of the body part at the upper end part of the narrow slit, whereby the pin will be prevented from escaping from the grommet to be separated from each other.

According to the seventh aspect of the invention, although the pin and the grommet have been integrally connected by means of the small bridge pieces which can be torn off, the respective outer end sides of the small bridge pieces to be connected to the edge of the opening in the grommet are made more fragile than the inner end sides thereof to be connected to the edge of the tip end part of the pin. Accordingly, when the small bridge pieces are torn off for the purpose of obtaining the provisionally retained state between the pin and the grommet, the tearing action will be exclusively conducted on a side of the grommet, and the remaining portions of the small bridge pieces will hardly become obstacles when the pin is completely inserted into the body part of the grommet. Therefore, the pin can be smoothly inserted into the body part of the grommet.

According to the eighth aspect of the invention, because the small bridge pieces are located at the respective circumferential positions corresponding to the slits which divide the body part of the grommet, the tip end portions of the small bridge pieces which have been torn off on the side of the grommet will be absorbed in the slits, and the portions of the small bridge pieces which remain on the side of the pin will hardly become obstacles on occasion of inserting the pin into the body part of the grommet.

According to the ninth aspect of the invention, because the inner end sides of the small bridge pieces are connected to the face having the tapered shape at the tip end part of the pin, the small bridge pieces can be made as longer as possible in size, according to an angle of the tapered shape, which renders the small bridge pieces to be more easily torn off on the side of the grommet.

According to the tenth aspect of the invention, because the four sheets of the small bridge pieces are located on the radial lines intersecting at the right angles, the pin and the grommet can be coupled to each other in a stabilized manner. Therefore, a work for assembling them into the provisionally retained state can be conducted easily.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

First Embodiment

An object of the invention is to provide an inexpensive clipping device of push-push type in which a pin is provided with a stepped part which can be formed by integral molding, and a grommet is provided with a swinging piece which can be formed by integral molding, when the pin and the grommet are integrally molded of synthetic resin, whereby the pin will be prevented from being excessively pushed into a body part of the grommet.

Figure 1:
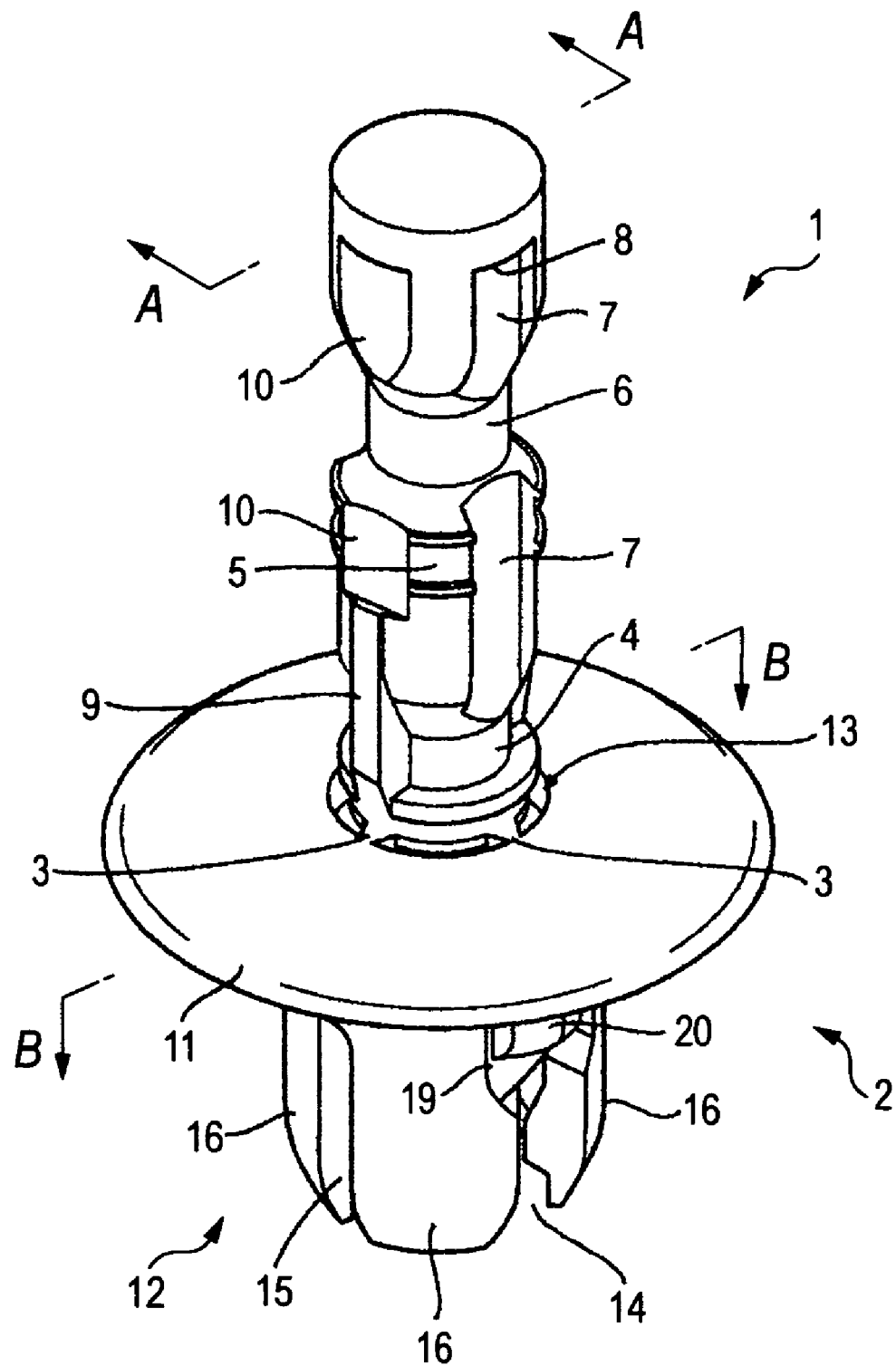
FIG. 1 is a perspective view showing an outer appearance of a clipping device according to one embodiment of the invention.
Figure 2A:
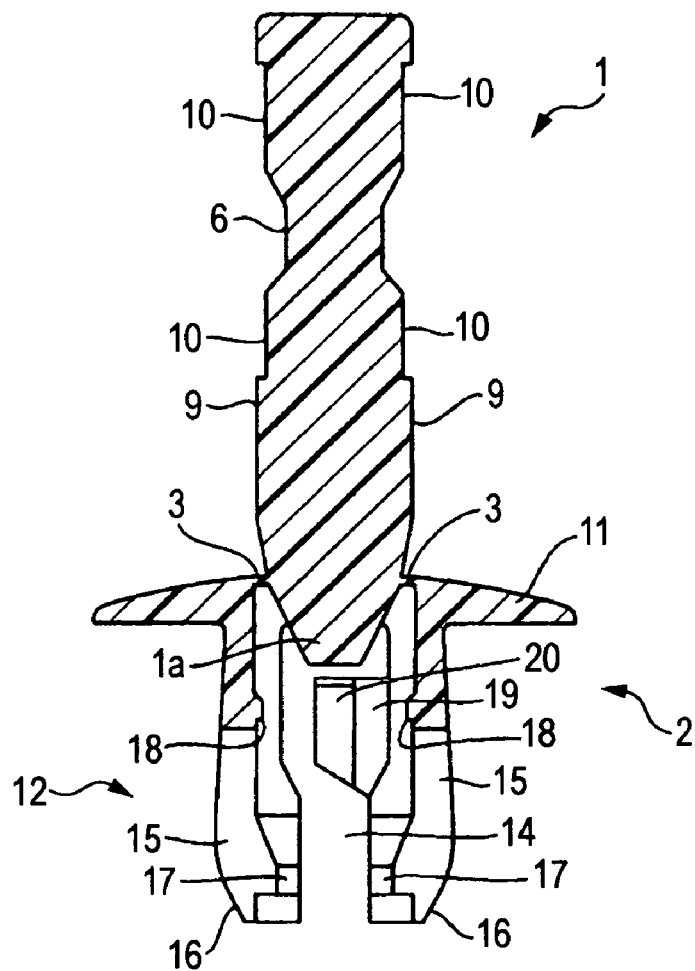
FIG. 2A is a sectional view taken along a line A-A in FIG. 1.
Figure 2B:
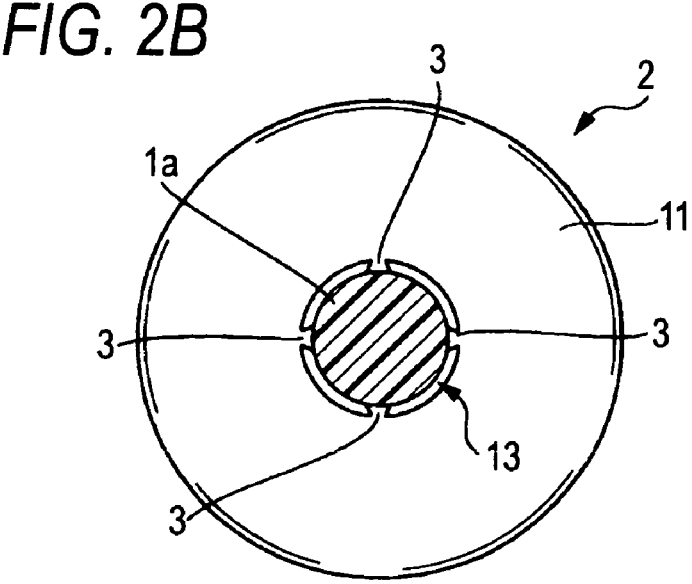
FIG. 2B is a sectional view taken along a line B-B in FIG. 1.

Now, the invention will be described in detail, referring to a preferred embodiment as shown in the drawings. Although a clipping device in this embodiment includes two components, namely, a pin 1 and a grommet 2 in the same manner as in the prior art, a characteristic feature of this clipping device is that the pin 1 and the grommet 2 are integrally molded of synthetic resin, as shown in FIG. 1. On occasion of integrally molding, the pin 1 and the grommet 2 are displaced from each other in an axial direction, and coupled by four small bridge pieces 3, in a state where a tip end 1a of the pin 1 has been inserted into an interior of the grommet 2. A provisionally retained state can be obtained, by pushing the pin 1 into the interior of the grommet 2 while tearing off the small bridge pieces 3.

Figure 3A:
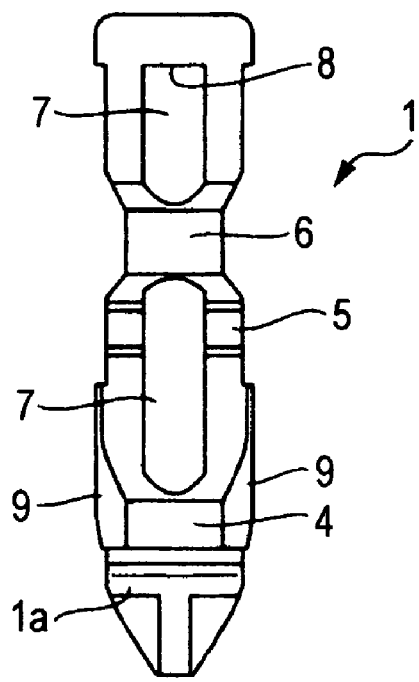
FIG. 3A is a front view of a pin.
Figure 3B:
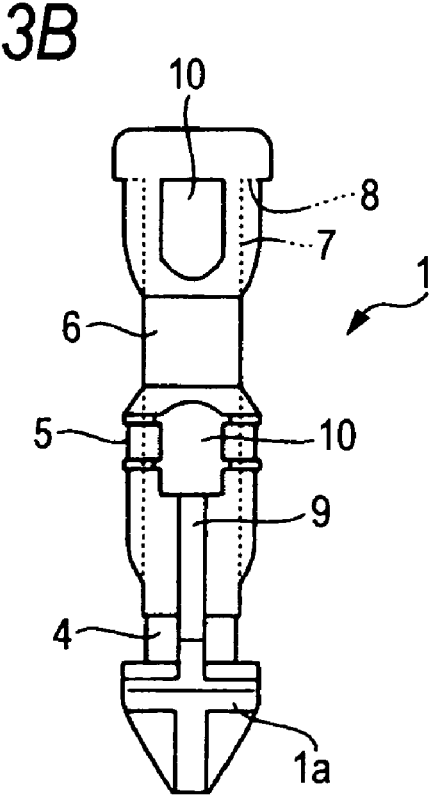
FIG. 3B is a side view of the pin.
Figure 4A:
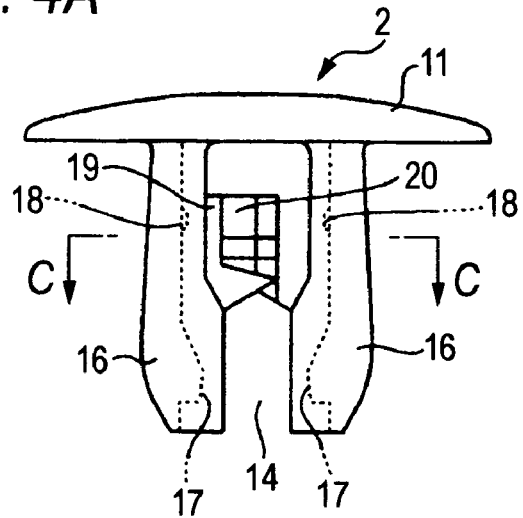
FIG. 4A is a front view of a grommet.
Figure 4B:
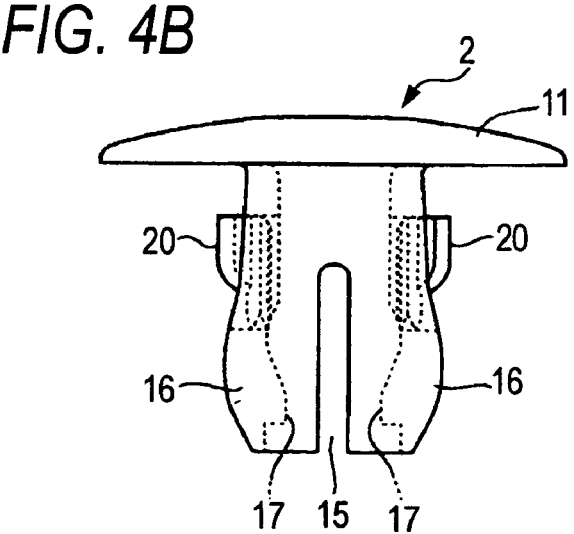
FIG. 4B is a side view of the grommet.
Figure 4C:
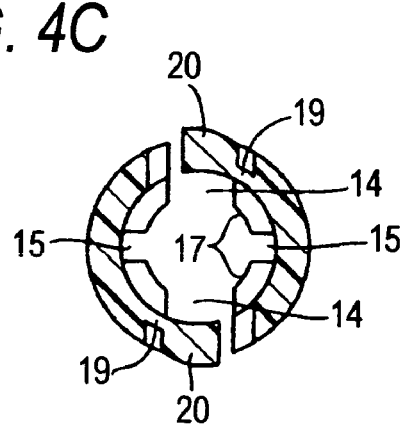
FIG. 4C is a sectional view taken along a line C-C in FIG. 4A.

A structure of the pin 1 will be first described. As shown also in FIGS. 3A and 3B, the pin 1, the former, is in a columnar shape having the tip end part 1a tapered, and provided with an engaging groove 4, an enlarging groove 5, and a releasing groove 6 which are respectively formed at a determined distance, at a right angle with respect to an axial direction, in this order from below. Moreover, a pair of guide grooves 7 in a concave shape for guiding movements of swinging pieces 20 of the grommet 2 which will be described below are formed in an axial direction on one pair of opposed outer peripheral faces of the pin 1, and stepped parts 8 to be butted against the swinging pieces 20 of the grommet 2 are formed at respective upper ends of the guide grooves 7. Further, rib walls 9 adapted to enter into narrow slits 15 of the grommet 2 which will be described below are formed on the other pair of the opposed outer peripheral faces, in a range from the engaging groove 4 to the enlarging groove 5, so that upper end edges of the rib walls 9 can be engaged with convex parts 18 of the grommet 2 which will be described below. Guide grooves 10 which will guide the convex parts 18 of the grommet 2 are formed above the rib walls 9 on the other pair of the opposed outer peripheral faces.

The above described engaging groove 4 at the lower position and the releasing groove 6 at the upper position have small groove diameters to such an extent that they can completely contain inwardly directed projections 17 of divisional leg portions 16 of the grommet 2 which will be described below, without rendering the divisional leg portions 16 enlarged. The enlarging groove 5 at the middle position has a larger groove diameter than the engaging groove 4 and the releasing groove 6, so that the divisional leg portions 16 can be enlarged outwardly, when the inwardly directed projections 17 of the divisional leg portions 16 have come into engagement with the enlarging groove 5.

Then, a structure of the grommet 2 will be described. As shown also in FIGS. 2A and 4A to 4C, the grommet 2, the latter, has a cylindrical shape including a flange part 11 and a body part 12. The flange part 11 in a disc-like shape is formed, at its center, with an opening 13 which communicates with an interior of the body part 12. A peripheral wall of the hollow shaped body part 12 is divided into the four divisional leg portions 16 interposing slits 14, 15, and the inwardly directed projections 17 adapted to be sequentially engaged with the above described grooves 4, 5, 6 are respectively formed on inner faces of the divisional leg portions 16.

The slits which divide the aforesaid body part 12 includes two types of slits, namely, a pair of broad slits 14 and a pair of narrow slits 15, as shown in the drawings. The broad slit 14 opens from a bottom of the body part 12 continued to the flange part 11, and is narrowed in its lower part as compared with a broader upper part thereof. The narrow slit 15 opens halfway from the bottom of the body part 12 in an upward direction, and the convex parts 18 protruding inwardly into the body part 12 and adapted to be engaged with the aforesaid rib walls 9 are formed on the inner faces of the body part at the upper end of the narrow slit 15.

In addition, in a depth of an upper part of the broad slit 14 which has a particularly large space, each of the divisional leg portions 16 defining the slits 14 is provided with the swinging piece 20 which is connected by way of a connecting piece 19 so as to swing around the connecting piece 19 in a horizontal direction. The swinging piece 20 is designed in such a manner that it is projected outwardly from the outer peripheral face of the body part 12 while it is in a free state, and adapted to be pressed by inner peripheral faces of the mounting holes in the panels thereby to be inwardly projected into the body part 12, when the grommet 2 has been inserted into the mounting holes. Particularly in this embodiment, a projecting amount of the swinging piece 20 is so set as to be larger at a position remote from the aforesaid connecting piece 19, and a thickness of the aforesaid connecting piece 19 is so set as to be smaller than a thickness of the swinging piece 20 itself.

As described, the swinging piece 20 is positioned in the depth in the upper part of the broad slit 14 which has the particularly large space. Consequently, even though the swinging piece 20 is connected to each of the divisional leg portions 16, the inwardly projecting amount of the swinging piece 20 into the body part 12 can be sufficiently secured, since the upper part of the divisional leg portion 16 will not be enlarged outwardly. It is also possible to sufficiently obtain a circumferential length of the swinging piece 20 itself and a length of the connecting piece 19, and accordingly, the swinging piece 20 will be positively urged to be flexed inwardly, and the inwardly projecting amount of the swinging piece 20 can be more reliably secured.

Figure 5:
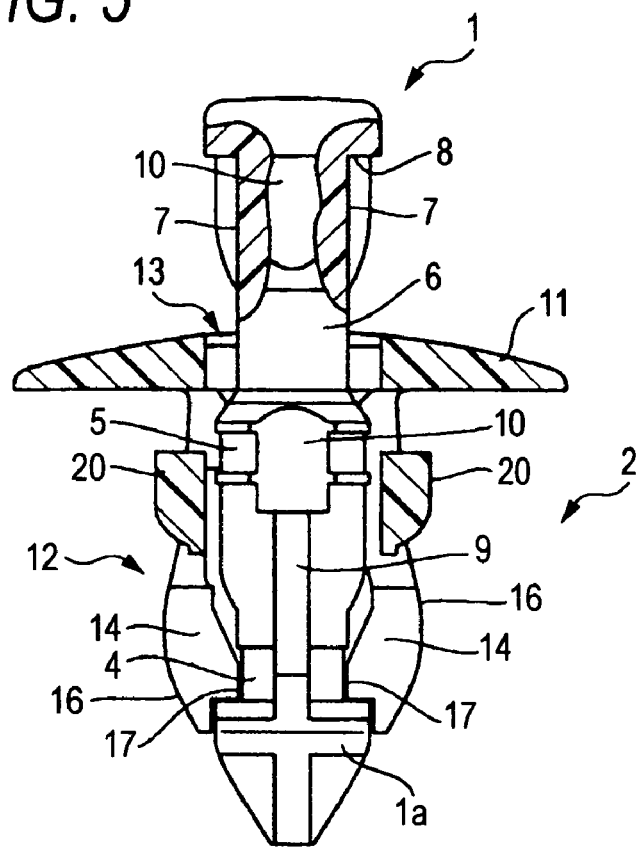
FIG. 5 is a sectional view showing the pin and the grommet in a provisionally retained state.

In case of superposing and fixing two panels P1 and P2 employing the clipping device having the above described structure, the pin 1 and the grommet 2 which have been integrally molded are assembled in a provisionally retained state, as a first step. In this case, the small bridge pieces 3 will be broken inside or outside the molding cavity, and the pin 1 will be inserted from the tip end 1a into the body part 12 of the grommet 2 through the opening 13 in the flange part 11. Then, as shown in FIG. 5, the inwardly directed projections 17 of the divisional leg portions 16 defining the body part 12 of the grommet 2 will be engaged with the engaging groove 4 formed at the lower position of the pin 1, and thus, the provisionally retained state between the pin 1 and the grommet 2 can be easily obtained. On this occasion however, none of the divisional leg portions 16 has been enlarged outwardly, because the inwardly directed projections 17 are engaged with the engaging groove 4 having the small diameter. Moreover, outer faces of the swinging pieces 20 are projected outwardly from the outer peripheral face of the body part 12, because they are still in the free state.

Further, in this case, the rib walls 9 of the pin 1 enter into the narrow slits 15, though not specifically shown in the drawings, to retain the pin 1 from rotating with respect to the body part 12, and at the same time, the upper end edges of the rib walls 19 are engaged with the convex parts 18 which are formed on the inner face of the body part at the upper end parts of the narrow slits 15, thereby to reliably prevent the pin 1 from escaping from the grommet 2 to be separated from each other.

Figure 6:
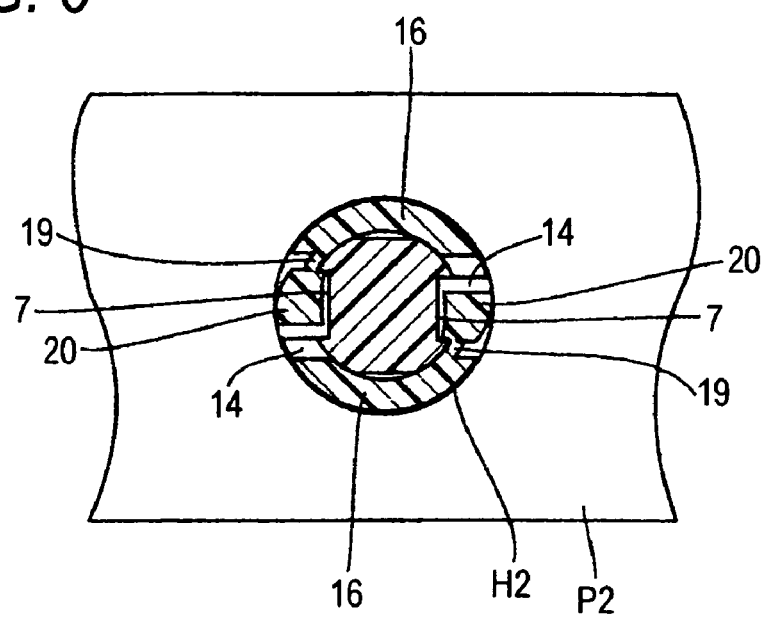
FIG. 6 is a cross sectional view showing a state where a body part of the grommet in the provisionally retained state has been inserted into mounting holes in panels.

After the provisionally retained state between the pin 1 and the grommet 2 has been obtained, the body part 12 of the grommet 2 is inserted into the mounting holes H1, H2 in the panels P1, P2. At the same time, the swinging pieces 20 projected outwardly are also inserted into the mounting holes H1, H2 by a guide of the tapered shape formed in the lower part thereof. On this occasion, as shown in FIG. 6, the swinging pieces 20 are pressed with the inner peripheral faces of the mounting holes H1, H2 thereby to be projected inwardly into the body part 12, and projected tip ends thereof will be received in the guide grooves 7 which are formed on the outer peripheral face of the pin 1 corresponding to the swinging pieces 20. Therefore, even though the swinging pieces 20 are projected inwardly, insertion of the pin 1 will not be hindered.

Figure 7:
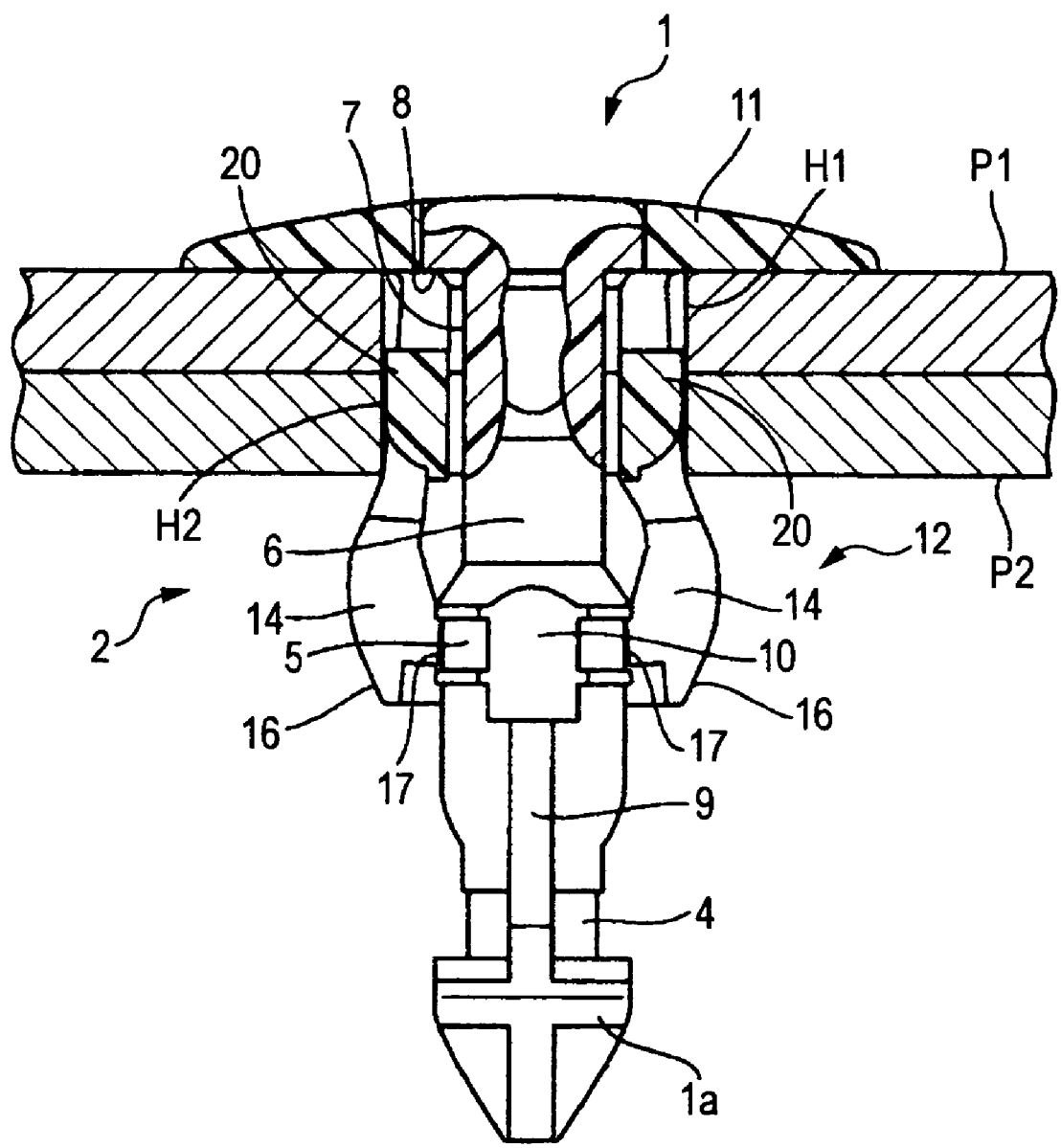
FIG. 7 is a sectional view showing a state where the two panels have been superposed and fixed employing the pin and the grommet.

Thereafter, an upper part of the pin 1 which is upwardly projected from the flange part 11 of the grommet 2 will be further pushed into the interior. Then, the inwardly directed projections 17 of the divisional leg portions 16 will be disengaged from the engaging groove 4 at the lower position, and will be engaged, this time, with the enlarging groove 5 at the middle position. As the results, the divisional leg portions 16 will be forcibly enlarged outwardly, as shown in FIG. 7, thereby to clamp the panels P1, P2 in cooperation with the flange part 11. In this manner, the two panels P1, P2 can be reliably fixed to each other in the superposed state.

Figure 8:
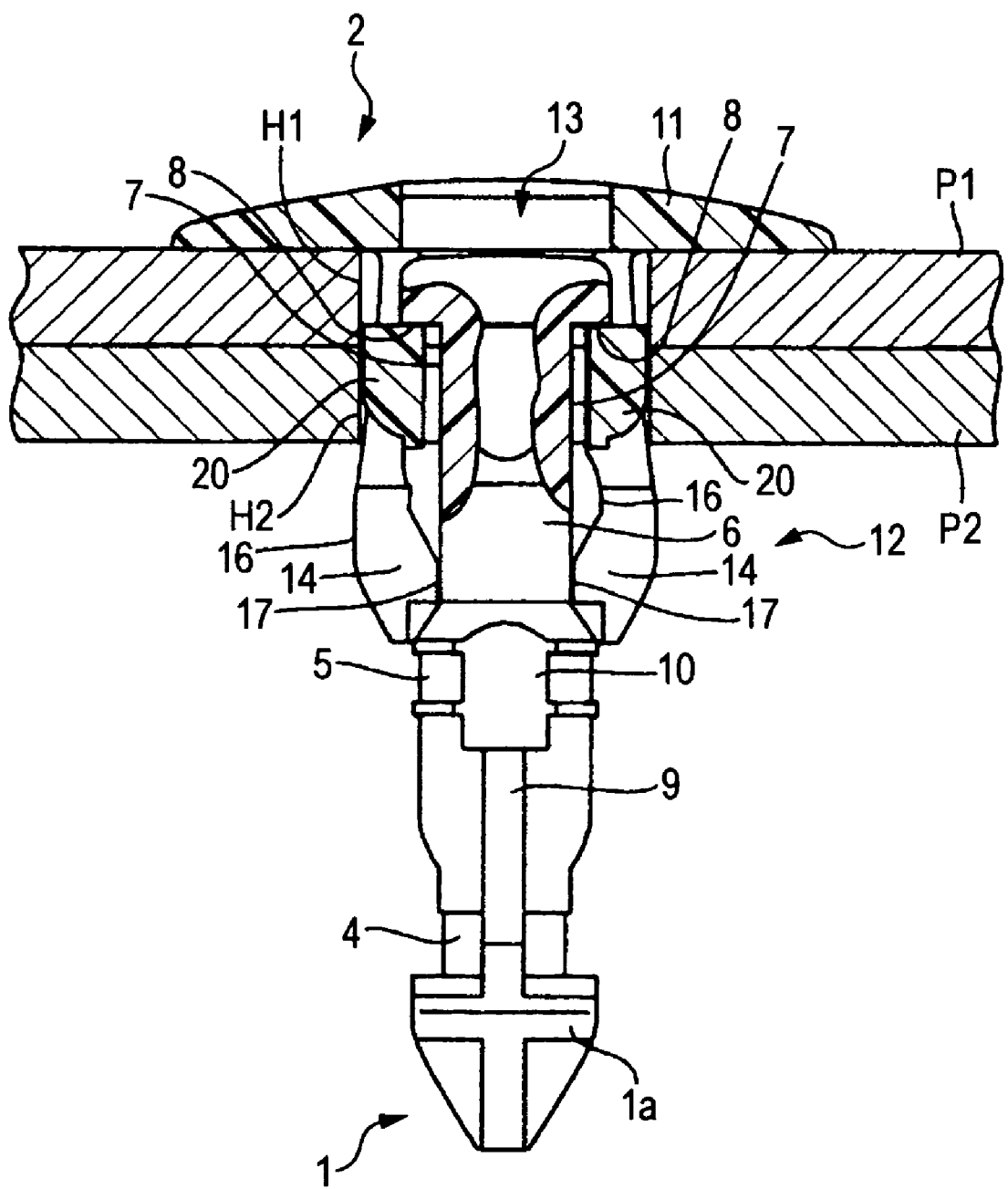
FIG. 8 is a sectional view showing a state where an excessive insertion of the pin has been prevented.

On the other hand, in order to release the superposed and fixed state of the panels P1, P2, the pin 1 will be further pushed in the same direction as the superposing and fixing direction. Then, the inwardly directed projections 17 of the divisional leg portions 16 will be disengaged from the enlarging groove 5, and will be engaged, this time, with the releasing groove 6 at the upper position which has the small diameter, as shown in FIG. 8. Consequently, the divisional leg portions 16 will be automatically released from the enlarged state and return to the original free state, thereby to release the clamped state of the panels P1, P2. Thereafter, by gripping the flange part 11 of the grommet 2 and pulling out the grommet 2 together with the pin 1 from the mounting holes H1, H2, the panels P1, P2 can be easily released from the superposed and fixed state, without damaging the pin 1 and the grommet 2.

In this state, the stepped parts 8 which are formed at the upper ends of the guide grooves 7 will be butted against the upper faces of the aforesaid swinging pieces 20 which have been projected inwardly, thus reliably preventing the pin 1 from being further pushed into the interior. Therefore, the pin 1 will be never pushed excessively into the interior of the grommet 2, in the same manner as in the prior art.

The clipping device according to the embodiment is extremely convenient in case where two sheet members such as two panels or a panel and a decorative material are fixed to each other in a superposed state, because the pin 1 and the grommet 2 are integrally formed of synthetic resin, the pin 1 being provided with the stepped parts 8, the grommet 2 being provided with the swinging pieces 20 to be butted against the stepped parts 8, whereby an excessive insertion of the pin 1 into the body part 12 of the grommet 2 can be prevented.

Second Embodiment

The second embodiment of the invention is constructed in such a manner that in case where the pin and the grommet are coupled to each other by means of the small bridge pieces which can be torn off, the respective outer end sides of the small bridge pieces to be connected to the edge of the opening in the grommet are made more fragile than the inner end sides thereof to be connected to the edge of the tip end part of the pin, whereby, when the small bridge pieces are torn off for the purpose of obtaining the provisionally retained state between the pin and the grommet, the tearing action is conducted on the grommet side, and the portions of the small bridge pieces which remain on the pin side hardly become obstacles when the pin is completely inserted into the body part of the grommet in order to outwardly enlarge the body part of the grommet.

Besides, a clipping device of the second embodiment includes a part of configurations of the first embodiment that are explained by FIGS. 1 to 8. Therefore, in this embodiment, explanations of the overlapped configurations are omitted.

Figure 9:
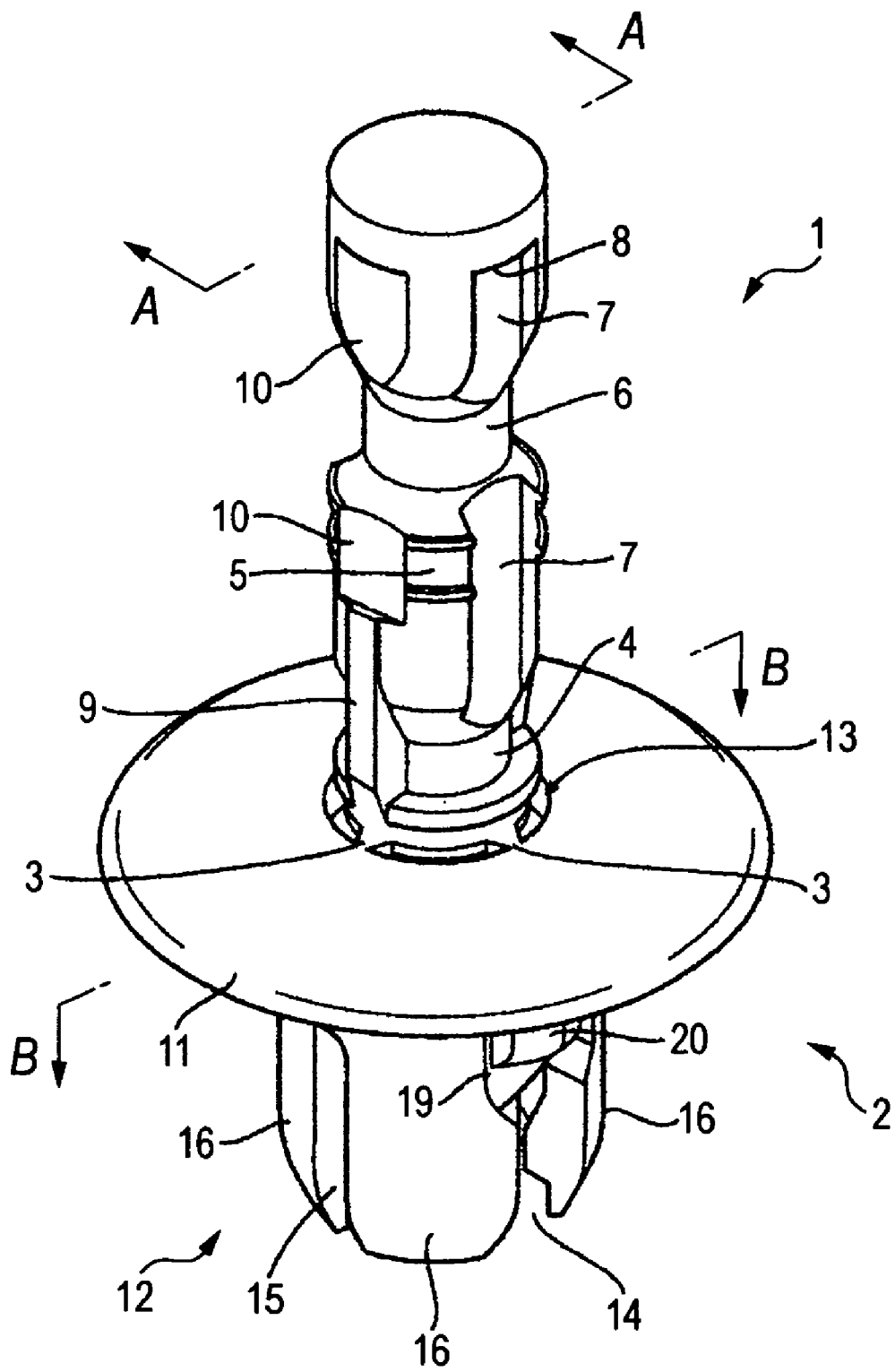
FIG. 9 is a perspective view showing an outer appearance of a clipping device according to one embodiment of the invention.
Figure 10:
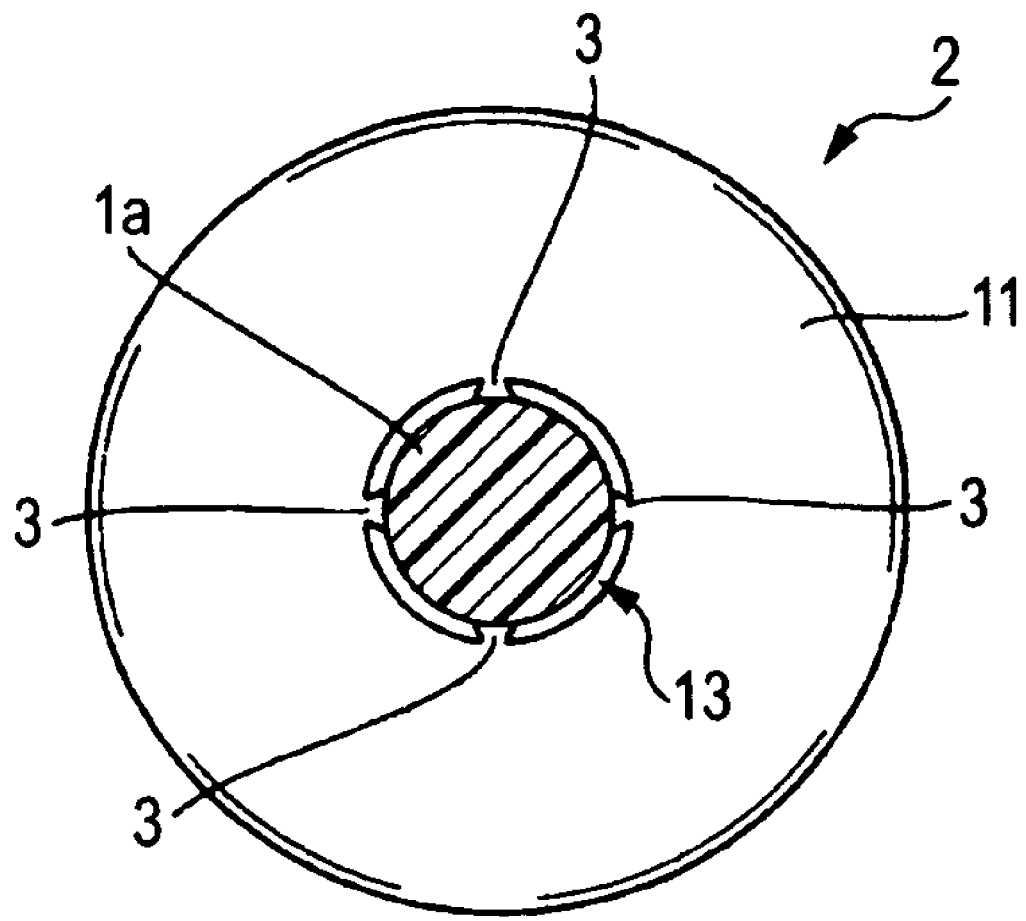
FIG. 10 is a sectional view taken along a line B-B in FIG. 9.

In this embodiment, as shown in FIGS. 9 and 10, on the premise that the pin 1 and the grommet 2 have such structures, the above described four sheets of the small bridge pieces 3 which can be torn off are designed in such a manner that respective outer end sides of the small bridge pieces 3 to be connected to an edge of the opening 13 in the grommet 2 are made more fragile than inner end sides thereof to be connected to an edge of the tip end part 1a of the pin 1 having the tapered shape. Accordingly, when the pin 1 is pushed into the body part 12 of the grommet 2 while tearing off the small bridge pieces 3 for the purpose of obtaining a provisionally retained state between the pin 1 and the grommet 2, the small bridge pieces 3 will be torn off on a side of the grommet 2. At the same time, the small bridge pieces 3 are located at respective circumferential positions corresponding to the above described slits 14, 15, and on radial lines intersecting at right angles.

Therefore, in a state where the pin 1 and the grommet 2 are coupled to each other, they can be coupled in a stabilized manner, because the four sheets of the small bridge pieces are located on the radial lines intersecting at the right angles. Accordingly, it is needless to say that a work for assembling the pin 1 and the grommet 2 into the provisionally retained state will be easier. Especially, when the small bridge pieces 3 are torn off, the tearing action is conducted in the narrow outer end sides of the small bridge pieces which are connected to the edge of the opening 13 in the grommet 2, and consequently, almost entire bodies of the small bridge pieces 3 will remain on a side of the tip end part 1a of the pin 1. Moreover, because the inner end sides of the small bridge pieces 3 are connected to the tip end part 1a of the pin 1, the small bridge pieces 3 can be made as longer as possible in size, according to an angle of the tapered shape of the tip end part 1a, which renders the small bridge pieces 3 to be easily torn off on the side of the grommet 2.

In this case, the four sheets of the small bridge pieces 3 have been already torn off on the side of the grommet 2 as described above, and will hardly become obstacles when the pin 1 is pushed in. Even though a portion of the small bridge piece 3 remains uncut on the pin 1, it will never hinder the insertion of the pin 1, because the relevant bridge piece 3 will be absorbed in the slit 14 or 15.

In the clipping device according to this embodiment, the respective outer end sides of the small bridge pieces to be connected to the edge of the opening in the grommet are made more fragile than the inner end sides thereof to be connected to the edge of the tip end part of the pin. Accordingly, when the small bridge pieces are torn off for the purpose of obtaining the provisionally retained state between the pin and the grommet, the tearing action will be conducted on the side of the grommet, and the remaining portions of the small bridge pieces will hardly become obstacles when the pin is completely inserted into the body part of the grommet. Therefore, the clipping device will be extremely convenient if it is applied to such a clipping device that the pin and the grommet need to be assembled into the provisionally retained state.

What is claimed is:

1. A clipping device comprising:
an integral unit comprising:
    a pin;
    a grommet; and
    a plurality of bridges extending between the pin and the grommet, said plurality of bridges comprising a portion that is more fragile than a remainder of said bridge, said bridge having a width, wherein the width of the bridge is smaller at the grommet than at the pin,
wherein:
    the pin includes an engaging groove, an enlarging groove, and a releasing groove on its outer peripheral face, in this order from a lower position, and the engaging groove at the lower position and the releasing groove at an upper position have smaller groove diameters than the enlarging groove at a middle position;
    the grommet includes a flange part at a top and a body part at a bottom, the body part being divided into a plurality of divisional leg portions with interposing slits, inwardly directed projections adapted to be engaged with the grooves of the pin on respective inner faces of the divisional leg portions;
    the grommet further includes a swinging piece connected to a side face of one of the divisional leg portions so as to swing in a radial direction of said grommet around a connecting part in the slit which divides the body part of the grommet;
    the pin further comprises a guide groove in an axial direction on an outer peripheral face of the pin corresponding to the swinging piece and a stepped part on the outer peripheral face of the pin at an upper end of the guide groove;
    the swinging piece is projected outwardly from the body part of the grommet while it is in a free state, and adapted to be pressed by inner peripheral faces of panel holes when inserted into the panel holes, thereby to be inwardly projected into the body part of the grommet;

wherein the swinging piece is rotatably connected to said divisional leg portion so as to swing on or in a plane that is substantially normal to a longitudinal axis of the grommet, and wherein said plurality of bridges are located at respective circumferential positions corresponding to a position of each of said interposing slits.

2. The clipping device according to claim 1, wherein:

the slit opens from a bottom to a top of the body part of the grommet; and the swinging piece is positioned in a depth of an upper part of this slit.

3. The clipping device according to claim 2, wherein:

one of the slits is narrower in its lower area and broader in its upper area; and the swinging piece is positioned in the broader area of the slit.

4. A clipping device according to claim 1, wherein:

the swinging piece has a large projecting amount at a position remote from the connecting part in the free state; and the connecting part has a smaller thickness than the swinging piece.

5. A clipping device according to claim 1, wherein:

the body part of the grommet has a narrow slit which opens halfway from the bottom to the top, a convex part on an inner face of the body part at an upper end area of the narrow slit; and the pin comprises a rib wall which is adapted to enter into the narrow slit, in a range from the engaging groove to the enlarging groove, whereby an upper end edge of the rib wall can be engaged with the convex part.

6. The clipping device of claim 1, wherein said swinging piece extends circumferentially from the side face of said plurality of divisional leg portions.

7. The clipping device of claim 1, wherein said swinging piece projects radially outward farther than the divisional leg portions.

8. The clipping device of claim 1, where the plurality of bridges is more fragile at the grommet than at the pin.

9. The clipping device according to claim 1, wherein the guide groove is one of a pair of guide grooves formed on a first pair of opposed peripheral faces of the pin.

10. The clipping device according to claim 9, further comprising a pair of ribs formed on a second pair of opposed peripheral faces.

11. The clipping device according to claim 10, further comprising a second pair of guide grooves disposed above the pair of ribs.

12. The clipping device according to claim 10, wherein the pair of ribs extend from the engaging groove to below the enlarging groove.

13. The clipping device according to claim 1, wherein the guide groove comprises a convex shape.

14. The clipping device according to claim 1, wherein the guide groove extends between the engaging groove and an upper end of the pin.

15. The clipping device according to claim 1, wherein the interposing slits comprises a pair of broad slits positioned on a first pair of opposing peripheral faces of the grommet and a pair of narrow slits positioned on second pair of opposing peripheral faces of the grommet.

16. A clipping device comprising:

a pin;

a grommet; and a plurality of bridges extending from the pin to the grommet, wherein:

the pin and the grommet are integrally molded of synthetic resin;

the pin includes an engaging groove, an enlarging groove, and a releasing groove on its outer peripheral face, in this order from a lower position, and the engaging groove at the lower position and the releasing groove at an upper position have smaller groove diameters than the enlarging groove at a middle position;

the grommet includes a flange part at a top and a body part at a bottom, the body part being divided into a plurality of divisional leg portions with interposing slits, inwardly directed projections adapted to be engaged with the grooves of the pin on respective inner faces of the divisional leg portions;

the grommet further includes a swinging piece connected to a side face of one of the divisional leg portions so as to swing in a radial direction of said grommet around a connecting part in the slit which divides the body part of the grommet;

the pin further comprises a guide groove in an axial direction on an outer peripheral face of the pin corresponding to the swinging piece and a stepped part on the outer peripheral face of the pin at an upper end of the guide groove;

the swinging piece is projected outwardly from the body part of the grommet while it is in a free state, and adapted to be pressed by inner peripheral faces of panel holes when inserted into the panel holes, thereby to be inwardly projected into the body part of the grommet; and wherein the swinging piece is rotatably connected to a divisional leg portion so as to swing on or in a plane that is substantially normal to a longitudinal axis of the grommet, wherein a width of the plurality of bridges is smaller at the grommet than at the pin, and wherein said plurality of bridges are located at respective circumferential positions corresponding to a position of each of said interposing slits.

17. A clip comprising:

a grommet comprising a flange and a body, wherein the body comprises a plurality of legs and interposing slits, wherein one of the plurality of legs comprises a radially-inward extending projection and a swinging piece rotatably connected to a side of the one of the plurality of legs so as to swing on or in a plane that is substantially normal to the longitudinal axis of the grommet;

a pin comprising:

an engaging groove;

a releasing groove;

an enlarging groove on an outer peripheral face of said pin, having a larger groove diameter than the engaging groove and the releasing groove;

a guide groove in an axial direction on an outer peripheral face of the pin corresponding to the swinging piece; and a stepped part on the outer peripheral face of the pin at an upper end of the guide groove;

and a plurality of bridges extending from the pin to the grommet, said plurality of bridges comprising a portion that is more fragile than a remainder of said bridge, said plurality of bridges having a width wherein the width of the bridge is smaller at the grommet than at the pin, wherein the grommet is integrally molded with the pin, and wherein said plurality of bridges are located at respective circumferential positions corresponding to a position of each of said interposing slits.

18. The clip of claim 17, wherein the releasing groove is at a proximal end of the pin, the engaging groove is at a distal end of the pin, and the enlarging groove is between the releasing groove and the engaging groove.

19. The clip of claim 17, wherein the radially-inward extending projection is adapted to engage any of the engaging groove, the enlarging groove, and the releasing groove.

20. The clip of claim 17, wherein the swing is adapted to be pressed by an inner peripheral face of a panel hole to inwardly project into the body of the grommet.

21. The clip of claim 17, wherein the plurality of bridges is more fragile at the grommet than at the pin.

22. The clip of claim 17, wherein said swing extends circumferentially from the side of the one of the plurality of legs.

23. A clip comprising:
   a grommet comprising a flange and a body, wherein the body comprises a plurality of legs and interposing slits, wherein one of the plurality of legs comprises a radially-inward extending projection and a swinging piece rotatably connected to a side of the one of the plurality of legs so as to swing on or in a plane that is substantially normal to a longitudinal axis of the grommet;
   a pin comprising:
      an engaging groove;
      a releasing groove;
      an enlarging groove on an outer peripheral face of said pin, having a larger groove diameter than the engaging groove and the releasing groove;
      a guide groove in an axial direction on an outer peripheral face of the pin corresponding to the swinging piece; and
      a stepped part on the outer peripheral face of the pin at an upper end of the guide groove;
   and
   a plurality of bridges extending from the pin to the grommet,
   wherein a width of the plurality of bridges is smaller at the grommet than at the pin,
   wherein the grommet is integrally molded with the pin, and
   wherein said plurality of bridges are located at respective circumferential positions corresponding to a position of each of said interposing slits.

* * * * *